US 7,556,835 B2

(12) United States Patent
Hultin et al.

(10) Patent No.: US 7,556,835 B2
(45) Date of Patent: *Jul. 7, 2009

(54) HIGH EFFICIENCY PROTEIN EXTRACTION

(75) Inventors: Herbert O. Hultin, Rockport, MA (US); Stephen D. Kelleher, Wakefield, MA (US); Yuming Feng, Marlton, NJ (US); Mark P. Richards, Madison, WI (US); Hordur Kristinsson, Gainesville, FL (US); Ingrid Undeland, Göteborg (SE); Shuming Ke, Amherst, MA (US)

(73) Assignee: University of Massachusetts, Boston, MA (US)

( * ) Notice: Subject to any disclaimer, the term of this patent is extended or adjusted under 35 U.S.C. 154(b) by 155 days.

This patent is subject to a terminal disclaimer.

(21) Appl. No.: 10/363,612

(22) PCT Filed: Sep. 5, 2001

(86) PCT No.: PCT/US01/27513

§ 371 (c)(1), (2), (4) Date: Dec. 1, 2003

(87) PCT Pub. No.: WO02/20720

PCT Pub. Date: Mar. 14, 2002

(65) Prior Publication Data

US 2004/0067551 A1 Apr. 8, 2004

Related U.S. Application Data

(60) Provisional application No. 60/230,397, filed on Sep. 6, 2000.

(51) Int. Cl.
*A23L 1/31* (2006.01)
(52) U.S. Cl. .............. 426/574; 426/657; 426/643; 514/2; 530/412; 530/418; 530/422
(58) Field of Classification Search .......... 426/574, 426/657, 643; 514/2; 530/412, 418, 422
See application file for complete search history.

(56) References Cited

U.S. PATENT DOCUMENTS

| | | | |
|---|---|---|---|
| 2,875,061 A * | 2/1959 | Vogel et al. ............... 426/643 |
| 3,937,654 A | 2/1976 | Solomons et al. |
| 4,247,573 A | 1/1981 | Murray et al. |
| 4,340,612 A * | 7/1982 | Askman et al. ........... 426/276 |
| 4,350,624 A | 9/1982 | Herubel |
| 4,961,936 A * | 10/1990 | Rubin ........................ 426/7 |
| 5,086,166 A | 2/1992 | Lawhon et al. |
| 5,928,696 A * | 7/1999 | Best et al. ................. 426/417 |
| 6,005,073 A | 12/1999 | Hultin et al. |
| 6,136,959 A | 10/2000 | Hultin et al. |
| 6,451,975 B1 | 9/2002 | Hultin et al. |

OTHER PUBLICATIONS

English Abstract of Murata (Nippon Shokuhin Kagaku Kogaku Daishi 43, 575-81, 1996).*
Sakamoto, H. (J. Food Sci. 60 (2) 300-304, 1995).*
Drozdowski, B (Amer. Oil Chem. Soc. J. 46(7), 371-376, (1969).*
Batista, "Recovery of proteins from fish waste products by alkaline extraction," *Eur. Food Res. Technol.*, 210:84-89 (1999).
Foegeding et al., "Functionality of Muscle Proteins in Gel Formation," *Food Chemistry*, Third Edition, Chapter 15, p. 935 (1996).
Ishino et al, "Molecular Interaction in Alkali Denatured Soybean Proteins," *Cereal Chemistry*, 52(1):9-21 (Jan.-Feb. 1975).
Jelen et al., "Evaluation of Alkali Extracted Chicken Protein for Use in Luncheon Meats," *Can. Inst. Food Sci. Technol. J.*, 15(4):289-293 (1982).
Jelen et al., "Recovery of Meat Protein from Alkaline Extracts of Beef Bones," *J. Food Sci.*, 44(2):327-331 (Mar.-Apr. 1979).
Jiang et al., "Color and Quality of Mackerel Surimi as Affected by Alkaline Washing and Ozonation," *J. Food Sci.*, 63(4):652-655 (Jul./Aug. 1998).
Kelleher et al., "A new process for producing functional fish muscle proteins substantially free of lipid," 28th *Meeting of the Western European Fish Technologists Association*, Oct. 4-7, 1998, Tromsø, Norway, Abstract L18, 3 pages.
Kelleher et al., "Functional Chicken Muscle Protein Isolates Prepared Using Low Ionic Strength, Acid Solubilization/Precipitation," *53rd Annual Reciprocal Meat Conference—Meat Science in the New Millennium*, Jun. 18-21, 2000, Columbus, OH, pp. 76-81.
Kelleher et al., "Inhibition of Lipid Oxidation during Processing of Washed, Minced Atlantic Mackerel," *J. Food Sci.*, 57(5):1103-1108 and 1119 (Sep.-Oct. 1992).
Kelley et al., "Studies with Soybean Protein and Fiber Formation," *Cereal Chemistry*, 43:195-206 (1966).
Kristinsson et al., "Fish Protein Hydrolysates: Production, Biochemical, and Functional Properties," *Critical Reviews in Food Science and Nutrition*, 40(1):43-81 (2000).
López-Echevarría et al., "Effect of alkaline treatment and sodium erythorbate on functional properties of surimi gels made from frozen stored *Tilapia nilotica*," *1997 Annual Meeting and Food Expo of the Institute of Food Technology*, Book of Abstracts, Abstract 10-6, pp. 14-15 (1997).
López-Echevarría et al., "Effect of alkaline treatment on physicochemical and functional properties of surimi gels made of miofibrilar protein from *Tilapia nilotica*," *1996 Annual Meeting and Food Expo of the Institute of Food Technology*, Book of Abstracts, Abstract 62-8, p. 145 (1996).
McCurdy et al., "Laboratory and Pilot Scale Recovery of Protein from Mechanically Separated Chicken Residue," *J. Food Sci.*, 51(3):742-747 and 753 (1986).
Meinke et al., "Some factors influencing the production of protein isolates from whole fish," *J. Food Sci.*, 37(2):195-198 (Mar.-Apr. 1972).
Montecalvo et al., "Optimization of Processing Parameters for the Preparation of Flounder Frame Protein Product," *J. Food Sci.*, 49(1):172-176 and 187 (Jan.-Feb. 1984).
Ohyashiki et al., "A marked stimulation of $Fe^{3+}$-dependent lipid peroxidation in phospholipid liposomes under acidic conditions," *Biochimica et Biophysica Acta*, 1484:241-250 (2000).

(Continued)

*Primary Examiner*—David Lukton
(74) *Attorney, Agent, or Firm*—Fish & Richardson P.C.

(57) ABSTRACT

The invention relates to a process for isolating edible protein from animal muscle by solubilizing the protein in an alkaline aqueous solution.

52 Claims, 1 Drawing Sheet

OTHER PUBLICATIONS

Ozimek et al., "A Comparison of Mechanically Separated and Alkali Extracted Chicken Protein for Functional and Nutritional Properties," *J. Food Sci.*, 51(3):748-753 (May-Jun. 1986).

Pour-El et al., "Gelation Parameters of Enzymatically Modified Soy Protein Isolates," *Cereal Chemistry*, 53(3):438-456 (May-Jun. 1976).

Ramírez-Suárez et al., "Washing Effects on Gelling Properties and Color of Monterey Sardine (*Sardinops sagax caerulea*) Minced Flesh," *Journal of Aquatic Food Product Technology*, 9(2):55-67 (2000).

Richards et al., "Effect of pH on Lipid Oxidation Using Trout Hemolysate as a Catalyst: A Possible Role for Deoxyhemoglobin," *J. Agric. Food Chem.*, 48:3141-3147 (2000).

Schmidt, "Gelation and Coagulation," *Protein Functionality in Foods*, American Chemical Society Symposium Series 147, Chapter 7, pp. 131-147 (1981).

Shahidi et al., "Alkali-assisted extraction of proteins from meat and bone residues of harp seal (*Phoca groenlandica*)," *Food Chemistry*, 57(2):317-321 (1996).

Shahidi et al., "Base extraction of proteins from seal meat and bone residues," *41st Annual International Congress of Meat Science and Technology*, Proceedings vol. II, pp. 574-575 (1995).

Shahidi et al., "Solubilization and Thermostability of Water Dispersions of Muscle Structural Proteins of Atlantic Herring (*Clupea harengus*)," *J. Agric. Food Chem.*, 42(7):1440-1446 (1994).

Torten et al., "Evaluation of the Biuret and Dye-Binding Methods for Protein Determination in Meats," *J. Food Sci.*, 29:168-174 (1964).

Wu et al., "Rheological and calorimetric investigations of starch-fish protein systems during thermal processing," *Journal of Texture Studies*, 16(1):53-74 (1985).

Tannenbaum et al., "Solubilization of Fish Protein Concentrate", *Food Technology* 24:96-99 (May 1970).

Tannenbaum et al., "Solubilization of Fish Protein Concentrate", *Food Technology* 24:99-101 (May 1970).

Ackman, R.G., "Fish Lipids, Part 1," in "Advances in Fish Science and Technology," J.J. Connell ed., Fishing News Books Ltd., Farnham, Surrey, England, p. 87 (1980).

Kristinsson and Hultin, "Changes in conformation and subunit assembly of cod myosin at low and high pH and after subsequent refolding," J. Agric. Food Chem. 51:7187-96 (2003).

Kristinsson and Hultin, "Effect of low and high pH treatment on he functional properties of cod muscle proteins," J. Agric. Food Chem. 51:5103-110 (2003).

Kumar et al., "Temperature range of thermodynamic stability for the native state of reversible two-state proteins," Biochemistry 42:4864-73 (2003).

Kumar et al., "The alkali molten globule state of horse ferricytochrome c: observation of cold desaturation," J. Mol. Biol. 364:483-95 (2006).

Ozog and Bechet, "The effect of pH on the folding and stability of the myosin rod," Eur. J. Biochem. 234:501-505 (1995).

Rodriguez-Larrea et al., "Role of solvation barriers in protein kinetic stability," J. Mol. Biol. 360:715-24 (2006).

Schultz, G.E. and Schirmer, R.H., "Principles of Protein Structure," Springer Verlay, New York, p. 151 (1979).

Batista, "Recovery . . . " Simposium Internacional de Produção de Novas Proteínas e utilazação de Recursos Alimentares Inexplorados, Faro, Portugal, Apr. 4-6, 1991.

Chen et al., "Effects of Acid and Alkaline Reagents on the Color and Gel-forming Ability of Milkfish Kamaboko," *Fisheries Science*, 54:160-163 (1998).

Meinke et al., "Autolysis as a Factor in the Production of Protein Isolates from Whole Fish," *Journal of Food Science*, 38:864-866 (1973).

Opiacha et al., "Composition of Dehydrated Protein Extracts from Poultry Bone Resideu," *Food & Nutrition Journal of Muscle Foods*, 5:343-353 (1994).

Wimmer et al., "Washed Mechanically Separated Pork as a Surimi-like Meat-product Ingredient," *Journal of Food Science*, 58:254-258 (1993).

Kahn et al., "Squid Protein Isolate: Effect of Processing Conditions on Recovery Yields," J. of Food Science, 39:592-596 (1974).

\* cited by examiner

HIGH EFFICIENCY PROTEIN EXTRACTION

CROSS-REFERENCE TO RELATED APPLICATIONS

This application is the National Stage of International Application No. PCT/US01/27513, filed Sep. 5, 2001, which claims the benefit of priority from U.S. Provisional Application No. 60/230,397, filed Sep. 6, 2000.

STATEMENT AS TO FEDERALLY SPONSORED RESEARCH

This invention was made with Government support under U.S. Department of Commerce, National Oceanic and Atmospheric Administration Grant No. 5700000741; and U.S. Department of Agriculture, National Research Initiative Competitive Grant Program, Grant Nos. 9701691 and 99-33503-8285. The Government has certain rights in this invention.

FIELD OF THE INVENTION

This invention relates to a process for isolating edible protein from animal muscle by solubilizing the protein in an alkaline aqueous solution.

BACKGROUND OF THE INVENTION

Surimi or formed fish has been produced in Japan for about a thousand years. Only recently has surimi appeared in North American supermarkets as imitation crab legs, lobster chunks, shrimp, and scallops. North American surimi is typically produced from lean white fish, such as pollock or whiting.

Low value animal muscle (e.g., from fatty pelagic fish or poultry bone residue) is usually undesirable as a source of food for human consumption. After processing, the isolated protein is often characterized by unattractive textures, dark colors, and strong flavors, often as a consequence of membrane lipid oxidation.

SUMMARY OF THE INVENTION

The invention is based on the discovery that if animal muscle protein is solubilized in an alkaline solution, the resulting soluble protein can be isolated in high yields and in a substantially native and non-oxidized form more suitable for human consumption. It was discovered that alkaline treatment of animal muscle minimized the oxidative effects of deoxyhemoglobin and the hydrolysis of myosin, a major muscle protein, by lysosomal proteases. After the muscle protein is solubilized in an alkaline aqueous solution, various undesirable components (e.g., bones, neutral lipids, membrane lipids, fatty pieces, skin, cartilage, and other insoluble material) can be removed. The soluble protein is then precipitated and collected in an edible form.

Accordingly, the invention features a method for isolating edible protein from animal muscle (e.g., fish, such as pelagic fish, or chicken) by obtaining a mixture comprising animal muscle and water; increasing the pH of the mixture to a level sufficient to solubilize at least a portion of the insoluble animal protein in the animal muscle protein mixture; removing at least about 50% by weight of total membrane lipids from the mixture; precipitating the solubilized protein from the animal muscle protein mixture; and collecting the precipitated protein, thereby isolating the edible protein from the animal muscle. This isolated protein can be used for forming edible protein gels that can be used in foods such as, e.g., hot dogs and cooked surimi. To further limit the extent of oxidation, especially of membrane lipids, the mixture can include an iron chelator (i.e., a compound that binds to and inactivates the oxidizing potential of an iron atom or ion), such as ethylenediaminetetraacetic acid (EDTA), diethylenetriaminepentaacidic acid (DTPA), carnosine, anserine, uric acid, citric acid, phosphate, polyphosphate, ferritin, or transferrin The method can include an optional washing step, in which the raw animal muscle is rinsed with water prior to solubilization; or a step for removing insoluble matter such as bone skin and cartilage from solubilized protein. This can be accomplished using an optional low-speed centrifugation step prior to precipitation of the protein. As used herein, "low-speed" means about 4000×g or lower (e.g., 2000, 2500, 3000, 3250, 3500, or 3750×g), and "high-speed" means about 5000×g or higher (e.g., 5500, 6000, 7500, 8500, 10,000, or higher×g). Centrifugations can be performed for a sufficient time (e.g., 5, 10, 15, 20, 25, 30, 40, 60, or more minutes) to achieve the intended result, such as removal of membrane lipids or removal of insoluble material from the mixture.

The animal muscle can in general constitute 50% or less (e.g., 40, 30, 20, 15, 10, or 5% or less) by weight of the mixture. When removal of membrane lipids from the soluble proteins is desired, the percentage of animal muscle in the mixture should be less, e.g., 15, 10, or 8% or less by weight of the mixture, to render the viscosity of the solution low enough for separation of membrane lipids from an aqueous portion of the mixture. When the viscosity of the solubilized protein is reduced, at least about 50% (e.g., at least about 60, 70, 80 or 90%), by weight of the total membrane lipids present in the mixture can be removed.

Membrane lipids can be removed from a mixture using a number of methods. For example, centrifugation of the mixture at about 5000×g or higher (e.g., 6000, 7000, 8000, 9000, or 10,000×g or higher) is sufficient to pellet the membrane lipids below an aqueous layer containing solubilized protein. Where necessary or desirable, neutral lipids (e.g., oils) can be removed from the top of the aqueous layer. Other methods of removing membrane lipids from the mixture include filtration and the addition of an aggregant. As used herein, an "aggregant" is a material that, when added to a mixture, causes one or more dispersed components of the mixture to aggregate, thereby facilitating separation of the one or more components from the mixture.

The initial solubilization of animal muscle protein can be accomplished by increasing the pH of mixture to about 10.0 or above (e.g., 10.5 or above). The pH can be increased by adding polyphosphate to the mixture.

The solubilized protein can be precipitated by lowering the pH of the alkaline mixture to, e.g., about 5.5 or lower. For example, the pH can be lowered to about 4.0 or below (e.g., 2.5 to 3.5, especially 3.0), then raised to about 5.0 or above. The pH of the aqueous phase can be decreased by adding an acid, e.g., hydrochloric acid, to the aqueous phase. The salt concentration can be optionally adjusted to aid precipitation (e.g., by adding a salt such as NaCl), and a cryoprotectant optionally added to the precipitated protein. The precipitated protein can be collected by centrifugation and/or with the aid of an aggregant, such as a polyamine (e.g., spermine or spermidine), a neutral or ionic polymer, or any other specific aggregant that is also useful for aggregating membrane lipids.

In another aspect, the invention includes a method of isolating edible protein from animal muscle (e.g., fish or chicken) by obtaining a mixture comprising animal muscle and water; increasing the pH of the mixture to a level sufficient to solubilize at least a portion of the insoluble animal protein in the animal muscle protein mixture; precipitating the solubilized protein from the animal muscle protein mixture; and collecting the precipitated protein, thereby isolating the edible protein from the animal muscle. In this method, the temperature of the mixture is maintained at 15° C. or less (e.g., 10° or 5° or less) in each step to minimize denaturing of the protein and deleterious oxidation of contaminants such as membrane lipids. The collected precipitated protein provides a yield of at least 70% (e.g., at least 80, 90, 95%) by weight of the total animal muscle protein in the mixture prior to increasing the pH. Additional optional steps and materials, as described herein, can be used in this method, where applicable.

As an alternative to increasing the pH of a mixture containing animal muscle and water, the animal muscle can first be obtained and then mixed with an aqueous solution having a pH sufficiently alkaline to solubilize at least a portion of the animal protein.

The invention has several advantages. The methods of the invention inactivate or reduce the oxidative potential of hemoglobin, as well as minimize hydrolysis of myosin, a major component of animal muscle. In addition, optional features of the invention remove essentially all of the membrane lipids, thereby further stabilizing the edible protein against oxidation. Thus, the invention embodies a strategy of inactivating oxidants and removing undesirable substrates for oxidation, both of which help render an edible protein product suitable for commercial food products.

The methods described herein are useful for processing fatty muscle tissues as a feed composition, which are typical of low cost raw materials, such as would be found in the fatty fish species or mechanically deboned poultry meat. In addition, the methods are useful for isolating edible protein from lean animal muscle, such as white fish meat (e.g., cod).

The process of this invention also provides for increased yield of protein from animal muscle. Greater than about 70% by weight of protein can be typically obtained from muscle tissue using the methods of the invention. In some cases, protein yields of greater than 90% by weight can be achieved. Besides the obvious commercial value of having better yields, the improved yield results in less protein in the waste water during industrial processing, so that environmental pollution is decreased.

The methods of this invention do not require fresh or lean animal muscle as a starting material. Any spoilage (off smells or colors) due to oxidized lipids can be removed using the new methods. In addition, animal parts containing other fatty tissues such as skin can be used, since the offending lipids, as well as the parts themselves, can be removed. In the case of fish processing, the new methods eliminate the need to fillet the fish prior to protein isolation, thereby reducing the cost of processing. Similarly, by removing the lipids, the methods of the present invention reduce the amount of fat-soluble toxins (e.g., polychlorinated biphenyls or PCBs) in the food product.

Unless otherwise defined, all technical and scientific terms used herein have the same meaning as commonly understood by one of ordinary skill in the art to which this invention belongs. Although suitable methods and materials for the practice or testing of the present invention are described below, other methods and materials similar or equivalent to those described herein, which are well known in the art, can also be used. All publications, patent applications, patents, and other references mentioned herein are incorporated by reference in their entirety. In case of conflict, the present specification, including definitions, will control. In addition, the materials, methods, and examples are illustrative only and not intended to be limiting.

DETAILED DESCRIPTION

Figure 1:
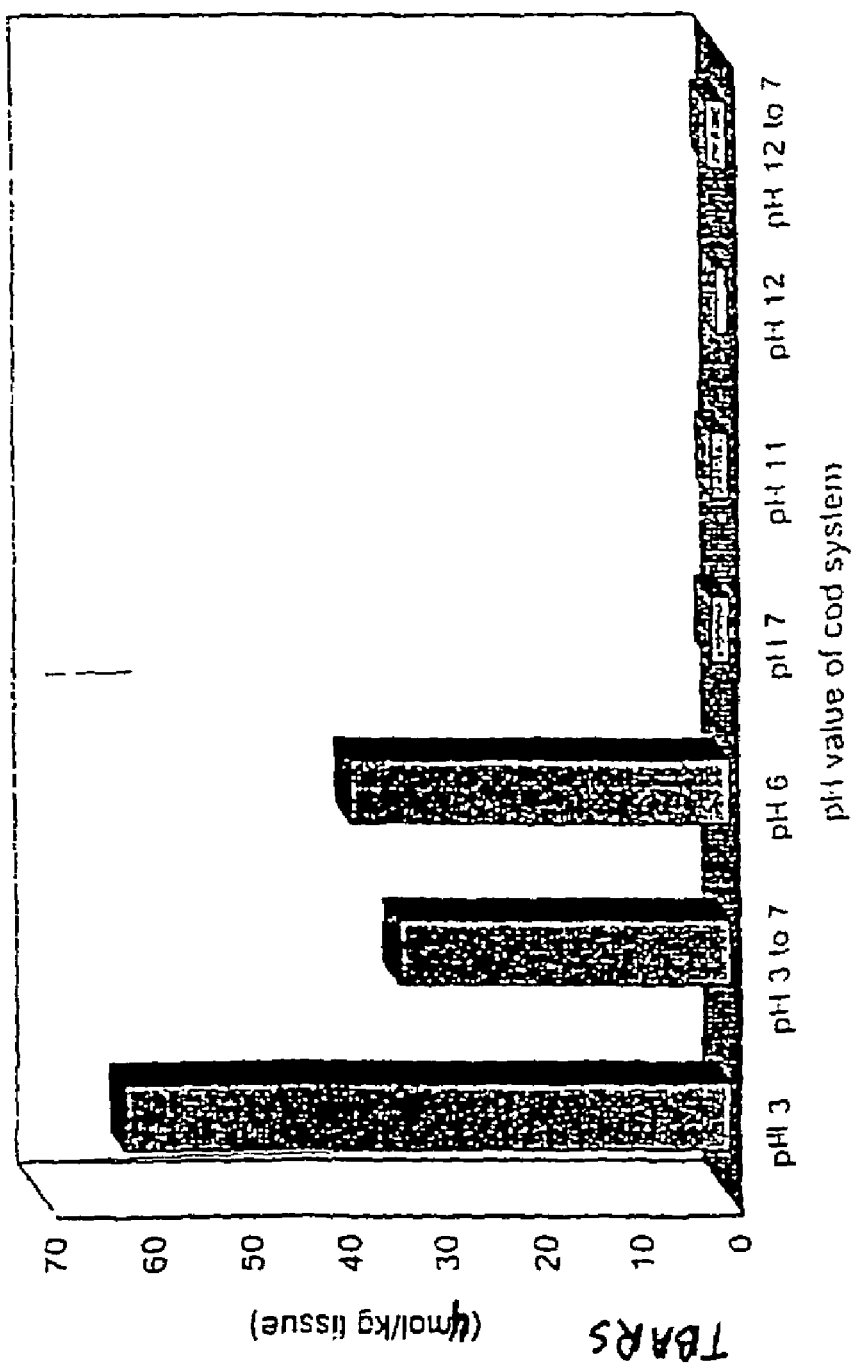
FIG. 1 is a bar graph of the amount of thiobarbituric acid reactive substances (TBARS) in cod muscle at specific pH values. The "pH 3 to 7" bar was held at pH 3 for 1 hour after the addition of hemolysate, before adjusting to pH 7 and then storage.

The invention relates to a new method of isolating edible protein from animal muscle. The resulting edible protein is relatively free from oxidation products, is capable of forming a gel, and can be processed into human foods. For example, the methods of the invention can be used to produce surimi from fatty fish as well as leaner white fish.

I. Isolating Lipid-Free Edible Protein

In general, the invention features a method for isolating edible protein from animal muscle (e.g., fish or chicken muscle) by first obtaining a mixture containing animal muscle and water, the animal muscle can be less than about 15% (e.g., 5% to 12%, or 10%) by weight of the mixture. Any aqueous solvent, e.g., water, can be used. In addition, the muscle can be washed with an aqueous solution prior to any mechanical manipulation. The muscle can be substantially diluted in water such that the solubilized protein suspension/solution produced in successive steps of the method is of a low enough viscosity so that the lipids or insoluble material can be removed by centrifugation. Lower viscosity can also aide removal of mixture components using methods other than centrifugation, as described herein. The viscosity of the protein suspension/solution is preferably about 75 mPa·s or less (e.g., about 35 mPa·s or less). Viscosity is measured, for example, with a Brookfield Model LVF viscometer (Brookfield Engineering, Stoughton, Mass.) using a #3 or #4 spindle at 60 rpm. The manufacturer's supplied conversion chart is then used to calculate viscosity. The animal muscle can be mechanically ground, homogenized, or chopped by hand.

After dilution of the animal muscle with water or an aqueous solution, the pH of the mixture is then increased, for example, to greater than about 10.0 (e.g., about 10.0 to 11.5, or about 10.5) so that at least 50%, e.g., at least 60, 70, 75, 80, 85, or 90%, of the animal protein by weight is solubilized. Alternatively, an aqueous solution containing sufficient base to raise the pH of the mixture to greater than about 10.0 (e.g., about 10.0 to 11.5, or about 10.5) can be added to the animal muscle to achieve the same level of solubilization.

Protein denaturation and protein hydrolysis is a function of temperature and time in solution, with increasing temperature and time in solution promoting protein denaturation and hydrolysis. Thus, it is desirable to reduce the temperature and the time the protein is in solution. As a result, the methods of the invention are preferably conducted at about 0° C. to 10° C. (e.g., 0° C., 1° C., 4° C., or 6° C.). The methods of the invention can also be carried out using frozen starting material, e.g., frozen muscle tissue. The aqueous composition also may contain components such as preservatives, which protect proteins from degradation. The ionic strength of the solution can be adjusted to avoid protein precipitation. Muscle tissue can also be homogenized, e.g., broken into pieces of approximately 5 mm or less, to achieve rapid extraction on adjustment of the pH, to further prevent denaturation of the proteins.

To remove membrane lipids from solubilized protein, the mixture can be centrifuged (e.g., at from about 5000×g to 10,000×g, or higher), so that the charged membrane lipids are separated from an aqueous phase, which is collected by, for example, decanting the aqueous phase. Several layers can form after centrifugation. At the bottom, the charged membrane lipids and any remaining residue is pelleted. The percentage sediment weight can be less than 20% (e.g., less than 10%), because a higher sediment percentage indicates that some of the desirable protein has been removed with the undesirable lipids. Percentage sediment weight is defined as the weight of pellet after centrifugation divided by the total homogenate weight. Above the pellet is an aqueous layer containing the solubilized protein. At the top, the neutral lipids (fats and oils), if any, float above the aqueous layer. The neutral lipids can be removed with a pipette before decanting the aqueous phase. Intervening layers can also be present depending on the source of muscle. For example, a gel of entrapped water containing solubilized protein can form between the aqueous layer and the pellet. This gel can be kept with the aqueous layer to increase protein yield. Of course, in industrial applications, the aqueous phase (and other phases, if desired) can be removed during centrifugation using a continuous-flow centrifuge or other industrial scale machinery.

Other methods besides centrifugation can be used to separate the membrane lipids from the aqueous phase. For example, a variety of filtration apparatus are available to the skilled artisan, depending on the size and volume of the material to be separated. In the absence of membrane lipid aggregants, a microfiltration apparatus is suitable for separating molecules having molecular weights in the range of 500,000 to 20 million. If the lipids are aggregated, particulate filtration may be suitable. These filtration units typically operate under pressure in the range of 2 to 350 kPa. In addition, cationic exchange membranes (sc-1) and anionic exchange membranes (sa-1) are suitable for removing membrane lipids from the mixture. In addition, various filtration methods can be used to select for or against muscle proteins of a particular size.

In some circumstances, an HF-lab-5 ultrafiltration unit (Romicon, Inc., Woburn, Mass.) can be used with a feed tank having an immersed cooling coil to maintain a relatively constant temperature. A cross flow process, which has the advantage of removing filter cake continuously, can also be used. To recover water or lower the salt content of the mixture, filtration membranes can be used with electrodialysis to drive out ions from the mixture. For this particular purpose, a stackpack unit (Stantech, Inc., Hamburg, Germany) can be used. This unit contains several cell pairs sandwiched between two electrode compartments.

Removal of membranes can also be facilitated by subjecting a mixture to high pressure, using, e.g., the MPF 7000 device (Mitsubishi Heavy Industries, Ltd.) or the High Pressure ACB 665 device (Gec, Alsthom; Nantes, Frances). High pressure treatment, accompanied by the proper temperature treatment, has the added benefit of killing known pathogens, in addition to membrane lipid aggregation and separation.

In addition to the use of high pressure, an aggregant can also be added to the mixture to facilitate membrane lipid removal. Suitable polymer aggregants include carrageenan, algin, demethylated pectin, gum arabic, chitosan, polyethyleneimine, spermine, and spermidine. Other aggregants include salts, such as a calcium salt, magnesium salt, sulfate, phosphate, and polyamine.

The pH of the aqueous phase can then be decreased so that the solubilized proteins precipitate. The yield can be at least 70% (e.g., at least 90%) by weight of the total starting protein in the mixture. The yield is defined as the precipitated protein mass divided by the total muscle protein mass. In one embodiment, the pH is decreased to about 5.5 or less to precipitate and collect the protein by, for example, centrifugation. In another embodiment, the pH of the aqueous phase is decreased to less than about 4.0 (e.g., about 2.5 to 3.5, or about 3.0) and then increased to more than about 5.0 to precipitate the protein. This further dip in pH may facilitate precipitation of sarcoplasmic proteins at the higher pH. Cryoprotectants (e.g., disaccharides and/or polyalcohols, such as polysorbatol) can be added to the precipitated protein to preserve and protect the product during freezing and storage.

Any acid that does not undesirably contaminate the final product can be used to lower the pH of the centrifuged mixture. For example, organic acids (e.g., malic acid, or tartaric acid) or mineral acids (e.g., hydrochloric acid or sulfuric acid) are suitable. Citric acid which has a favorable $pK_a$ value can provide buffering capacity at pH 3 and pH 5.5. Acids that have significant volatility and impart undesirable odors, such as acetic acid or butyric acid, are undesirable. Likewise, any of several bases can be used to raise the pH. A polyphosphate is suitable, since it also functions as an antioxidant and improves the functional properties of the muscle proteins.

Since the control of the pH of a mixture can often be difficult, the mixture can include a buffer that maintains an acidic target pH value or a basic target pH value. For example, a compound such as citrate, which has a $pK_a$ in the range of about 5.97, can be added to the mixture containing solubilized protein, if the solubilized protein is to be precipitated at a pH of about 6.0 or lower. In effect, citrate can act as a "brake" to ensure that the pH of the mixture does not overshoot a target pH value. Given a target pH, the choice of buffer is within the skill in the art of food science. Buffers suitable for a target pH in the range of 8.0 to 9.0 include glycine, arginine, asparagine, cysteine, carnosine, taurine, pyrophosphate, and orthophosphate. Buffers suitable for a target pH in the range of 5.5 to 6.5 include histidine, succinate, citrate, pyrophosphate, and malonate. Buffers suitable for a target pH in the range of 2.0 to 2.5 include alanine, glutamic acid, citric acid, lactic acid, phosphoric acid, or pyruvic acid.

Instead of reducing the pH of the solution, protein precipitation can be attained by adding polymers such as polysaccharides, charged polymers, marine hydrocolloids including alginates or carrageenan or the like, either alone or in combination with centrifugation. The salt concentration of the aqueous phase can also be adjusted to facilitate precipitation.

In addition, the various washes, supernatants, and flow-through fractions can be recycled back to earlier steps to recover even more protein using the methods. For example, after the solubilized protein has been precipitated, the aqueous fraction can be entered into another batch of animal muscle that has yet to be solubilized.

II. Use of Lipid-Free Edible Protein

The new methods can be used to process for human consumption materials that are not presently used as human foods because of their instability and unfavorable sensory qualities. Small species of fish such as herring, mackerel, menhaden, capelin, anchovies, or sardines are either underutilized or used for nonhuman uses. Approximately one half the fish presently caught in the world are not used for human food. The new methods allow for better utilization of the available food supply. The methods can utilize both white-flesh and dark-flesh fish, as well as chicken and other materials. The quality of non-fatty animal muscle (e.g., cod) can be improved in terms of yield using the methods of the invention.

The methods of the present invention result in protein isolates that are capable of forming gels, e.g., gels from mechanically deboned chicken meat, that are stronger than gels made from materials not processed by the methods of the present invention. Further, the gels have reduced fat and increased water binding ability compared to gels made from unprocessed materials. Further, the protein isolates produced by the methods of the present invention can be used as a functional ingredient to replace protein portions, e.g., meat, of various food products, such as sausages.

III. Sources of Animal Muscle

The process of this invention can be used to process flesh that is recovered from fish after the fillets have been removed. This material is typically not used for human food. Similarly, there is very little usage of the skeletons of chickens after parts are removed for retail sale. The methods of the present invention can process such chicken and fish parts to produce edible protein suitable for human consumption. Other underutilized muscle sources useful in the methods of the invention include Antarctic krill, which is available in large quantities but is difficult to convert to human food because of its small size.

Representative suitable starting sources of animal muscle for the processes of this invention include fish fillets, deheaded and gutted fish, crustacea (e.g., krill), molluscs (e.g., squid), chicken and other poultry (e.g., turkey), beef, pork, or lamb.

The invention will be further described in the following examples, which do not limit the scope of the invention defined by the claims.

EXAMPLES

Example 1

Titrating pH for Optimal Protein Solubilization

Preparation of fish. Excellent quality Atlantic cod was obtained from local fish processors. Cod muscle was well trimmed, ground to ⅛-inch pieces, mixed with nine parts cold (6° C.) deionized, distilled water for each part muscle, and homogenized in a Polytron® PCU 1 machine (Brinkman Instruments, Westbury, N.Y.) at a speed of 76 for 1 minute.

Alkaline solubilization. The pH of the cod homogenate was 6.85. One molar NaOH was added to the homogenates until it reached specific alkaline pH levels in the range of 9.04 to 11.50. The viscosities of the solutions at 4-6° C. at the specific pH values were measured with a Brookfield Model LVF® viscometer (Brookfield Engineering, Stoughton, Mass.) using a #3 or #4 spindle at 60 rpm. The manufacturer's supplied conversion chart was used to calculate viscosity. The mixture was then centrifuged at 9300 rpm in a No. 35 rotor (10,000×g) for 60 minutes using an L5-65B® ultracentrifuge, to form a top layer of emulsified oil, a middle aqueous layer containing the solubilized protein, and a membrane pellet. In some cases, when lean white fish is used, the emulsified oil layer may not be present. The aqueous layer was collected by removing the oil with a pipette and then decanting the aqueous solution. The viscosity and solubility results are shown in Table 1.

TABLE 1

| pH | viscosity (mPa·s) | % protein solubility | % sediment weight |
|---|---|---|---|
| 9.04 | 373.5 | 33.37 | 31.18 |
| 9.50 | 409.0 | 36.85 | 40.42 |
| 10.00 | 638.5 | 78.82 | 28.22 |
| 10.49 | 59.5 | 88.90 | 15.08 |
| 10.99 | 57.4 | 99.56 | 13.52 |
| 11.50 | 29.5 | >99.9 | 4.95 |
| 6.85 | 222.5 | — | — |

Protein mass was determined by using the Biuret reaction as described in Torten et al., J. Food Sci. 168:168-174, 1963. The percentage protein solubility is defined as protein mass in the aqueous layer divided by protein mass in the original homogenate. The percentage sediment weight is the weight of sediment after centrifugation divided by the total homogenate weight. High sediment weight values are indicative of protein removed with the membrane lipids. The bottom row in Table 1 represents the homogenate prior to adjustment with 1 M NaOH.

Table 1 indicates that greater than 70% protein solubility occurs at pH values above 10.0, viscosity drops below 75 mPa·s at pH values between 10.0 and 10.5 and above, and percentage sediment weight drops below 15% at about pH 10.5 or above. The data in Table 1 show that efficient protein solubility (>70%) occurs at pH values above about 10.5. As the viscosity drops below 75 mPa·s when the pH is above about 10.5, the percent protein solubility increases to above 75%. Similarly, percentage sediment weight decreases to below 15% when the pH rises above 10.5. If the viscosity was too high, the protein co-sedimented with the membrane and was removed. A viscosity of 75 mPa·s or less was typically needed to remove the membrane lipids by centrifugation, without removing a substantial portion of the protein along with them. The sample at pH 10 was highly viscous with good protein solubility. This sample, however, would have been difficult to work with in an industrial setting. Sediment weight percentages of about 15% or lower was considered acceptable. Thus, although a pH of about 10.0 could be used, higher pH values approaching and above 10.5 were of greater commercial interest.

Example 2

Production of Cod and Mackerel Surimi

Cod was prepared as described in Example 1 above. Atlantic mackerel was also obtained from local fish processors and processed as described in Example 1. The mackerel was of Stage II quality as assessed using the method described in Kelleher et al., J. Food. Sci. 57:1103-1108 and 1119, 1992. The mixtures were adjusted to pH 10.5 to solubilize the protein. The mixtures were then centrifuged, and the aqueous layer collected as described in Example 1.

One molar HCl was added to the aqueous protein solution until it reached pH 5.5. The precipitated protein was collected by centrifuging at 15,000 rpm (34,600×g) in a No. 19 rotor for 20 minutes in a Beckman® L5-65B ultracentrifuge. The supernatant was decanted. A cryoprotectant solution containing 4% sucrose, 4% sorbitol, and 1.2% sodium tripolyphosphate was added to the protein pellet. The mixture was formed into surimi by chopping for 30 seconds using an Oskar® model chopper (Sunbeam-Oster, Hattiesburg, Miss.) in a refrigerated, walk-in cooler. The surimi was packed into polyethylene Whirl-pak7® bags and frozen at −40° C. for at least 12 hours.

The frozen surimi was tempered in a walk-in cooler (4° C.) for 30 minutes prior to chopping for 2 minutes in the Oskar® chopper. NaCl was added to 3% (w/w) of surimi during chopping. The chopped paste was stuffed into stainless steel tubes (19 mm diameter×175 mm) and cooked at 90° C. for 20 minutes. The cooked surimi was set in ice for 20 minutes prior to being discharged from the tubes and held for 24 hours at 6° C. Physical properties of the cooked food product are shown in Table 2. Gel strength and displacement values were determined using a 5 mm stainless steel probe attached to an Instron® Model 1000 Universal Materials Testing Instrument (Instron Corp., Canton, Mass.) equipped with a 5 kg load cell and a crosshead speed of 100 mm/min. The values were recorded and calculated as described in Lanier, "Measurement of Surimi Composition and Functional Properties," In: Surimi Technology (Lanier et al., eds.), pp 123-163, Marcel Dekker, Inc., New York, 1992.

TABLE 2

| Muscle Source | Strain | Stress (kPa) |
|---|---|---|
| Cod | 2.21 ± 0.10 | 128.13 ± 7.33 |
| Mackerel | 1.95 ± 0.08 | 91.2 ± 0.00 |

For cod, the values represent the average and standard deviation of three cooked tubes from one gel sample. For mackerel, the values represent the average and standard deviation of two cooked tubes from one gel sample.

All gels were of good quality. In general, values of strain (elastic component) greater than 1.9 to 2.0 are rated as grade A gels. Stress (hardness component) values found in all gels were excellent, with most commercially available gels being at least about 30-35 kPa.

Example 3

Production of Protein Isolates from Herring Light Muscle

Preparation of fish. Fresh herring was obtained from D&B Bait, Gloucester, Mass., and transported on ice to the University of Mass. Marine Station (approx. 15 min. travel time). Upon arrival in the laboratory, the fish was graded visually and divided into four grades: In rigor, stage I, II, and III (Kelleher et al., J. Food. Sci. 57:1103-1108 and 1119, 1992). The post mortem age generally ranged between 6-36 hours. White muscle was manually excised and pushed through a 3 mm plate using a kitchen grinder (Kitchen Aid Inc., St. Joseph, Mich., USA).

Protein isolation. Ground muscle (120-300 g) was homogenized for 1 minute (speed 50, 120 V) with 9 volumes of ice-cold distilled water using a Kinematica Gmb H Polytron (Westbury, N.Y., USA) connected to a Variable autotransformer (Dayton, Ohio USA). The proteins in the homogenate were solubilized by drop-wise addition of 2N NaOH until reaching pH 10.8. The protein suspension was centrifuged within 15 minutes at 18,000×g (20 minutes) giving rise to four phases: a floating "emulsion layer," a clear supernatant, a soft gel-like sediment, and a slightly harder bottom sediment. The supernatant was separated from the "emulsion layer" by filtering these two phases through double cheesecloth. The soluble proteins were precipitated by adjusting the pH to values between pH 4.8 and 7, e.g., 5.5, using 2N HCl. Precipitated proteins were collected via a second centrifugation at 10,000×g. Manufacture of surimi. Excess water in the alkali-produced protein precipitates was squeezed out manually or removed via centrifugation (20 minutes, 18,000×g). This lowered the moisture content (Mc) of the alkaline produced precipitates from 88±1% to 72±3% (n=7). Both precipitates were then adjusted to 80% Mc with distilled water and blended with the cryoprotectant mixture (4% sucrose, 4% sorbitol, 0.3% sodium tripolyphosphate). The final Mc was 73.2±0.5%. The surimi was frozen in plastic bags at 80° C.

Manufacture of surimi gels. Gels were prepared as described by Kelleher & Hultin, (Kelleher & Hultin, Functional Chicken muscle protein isolates prepared using low ionic strength and acid solubilization/precipitation, In *Meat Science in the New Millennium*, Procedings from the 53$^{rd}$ annual reciprocal meat conference, The Ohio State Univeristy, Jun. 18-21, pp 76-81 (2000)). with the exception that the pH of the surimi was adjusted to 7.1-7.2 using 10% NaOH or 10% HCl after chopping in 2% NaCl. Surimi was packed either in cellulose casein (The Sausage Maker Inc., Buffalo, N.Y.) or in 19 mm metal tubes, depending upon the type of gel measurements to be carried out.

Quality of gels. Strain and stress (at structural failure) were analyzed using the torsion technique of Wu et al., J. Tex. Studies, 16: 53-74 (1985), or with a Rheo Tex model gelometer AP-83 (Sun Sciences Co. Seattle, Wash., USA). The latter measured the deformation (mm) and the peak force (g) required to penetrate 2.5 cm sections of the gels. Gels were also subjected to the folding test described by Kudo et al. (1973) by folding a 3 mm slice of the gel once or twice. The Hunter color values, "L," "a," and "b," were measured on gels according to Kelleher and Hultin. Supra.

Table 3 provides data from alkali aided preparation of surimi and surimi gels using fresh herring light muscle and herring light muscle from fish aged 6 days on ice, which was processed in the same way. The cryoprotectant mixture consisted of 4% sorbitol, 4% sucrose, and 0.3% sodium tripolyphosphate. Gels contained 2% NaCl and were formed at 90° C. for 30 minutes. Break force and deformation were measured with a Rheotex AP-83 (Sun Science Co. Ltd, Nichimo International Inc, Seattle, Wash., USA). Values within the same row bearing different numbers are significantly different ($p \leq 0.05$). The data indicate that good quality surimi and surimi gels can be prepared from both fresh and aged herring using the methods of the present invention.

TABLE 3

|  | Fresh herring pH 10.8 | Aged herring pH 10.8 |
|---|---|---|
| Raw material/surimi characteristics |  |  |
| Moisture Content (Mc) in muscle (%) | 79.6 | 80.6 |
| Muscle lipid content (% dw) | 11.1 | 8.8 |
| Muscle TBARS (μmol TBA/kg) | 5 | 28 |
| Mc in protein precipitate (%) | 87.3 | 87.7 |
| Mc in dewatered protein precipitate (%) | 74.4 | 74.5 |
| Mc in surimi with cryoprotectants | 72.5 | 73.1 |
| pH in surimi with cryoprotectants | 6.87 | 6.42 |
| pH prior to gelation | 7.15 | 7.11 |
| Mc in final surimi gel (%) | 70.7 | 69.9 |
| Gel characteristics |  |  |
| Folding test | 5 | 3 |
| Break force (g) | 871 ± 62 | 464 ± 11 |
| Deformation (mm) | 9.2 ± 0.7 | 6.2 ± 0.3 |

Table 4 provides data from alkali aided preparation of surimi and surimi gels from fresh herring light muscle. The cryoprotectant mixture consisted of 4% sorbitol, 4% sucrose, and 0.3% sodium tripolyphosphate. Gels contained 2% NaCl and were formed at 90° C. for 30 minutes. Stress and strain was measured using the torsion technique (Wu et al., J. Tex. Studies 16: 53-64 (1985)) using a Brookfield Digital viscometer (Model DV-II, Brookfield engineering Inc. Stoughton, Mass., USA). Results are expressed as mean±SD (n=4).

Color was measured with a Hunter LabScan II colorimeter (Hunter Associates Laboratories, Reston, Va.). Color measurements (are expressed as mean±SD (n=5). Whiteness was calculated according to the following formula: $100-((100-L)^2+a^2+b^2)^{0.5}$ (Lanier, "Measurement of Surimi Composition and Functional Properties," In: Surimi Technology (Lanier et al., eds.), pp 123-163, Marcel Dekker, Inc., New York, 1992) using the average values of L, a, and b (See Kelleher and Hultin (2000), Supra).

TABLE 4

|  | pH 10.8 |
| --- | --- |
| Raw material/surimi characterisitics |  |
| Mc in muscle (%) | 80 |
| Muscle lipid content (% dw) | 11.3 |
| Mc in protein precipitate (%) | 87.5 |
| Mc in dewatered protein precipitate (%) | 72.8 |
| Mc surimi with cryoprotectants (%) | 73.6 |
| pH surimi with cryoprotectants | 6.0 |
| pH prior to gelatin | 7.1 |
| Gel characteristics |  |
| Mc in final surimi gel (%) | 74.1 |
| Folding test | 5 |
| Stress (kpa) | 56.1 ± 2.4 |
| Strain | 1.6 ± 0.1 |
| G | 35.4 ± 2.1 |
| L | 66.5 ± 0.3 |
| a | −2.4 ± 0.4 |
| b | 8.1 ± 0.9 |
| Whiteness | 65.5 |

Example 4

Production of Protein Isolates from Mechanically Separated Deboned Chicken Meat (MSDC)

A protein isolate was prepared from MSDC by the alkaline process similar to that described in Example 3. The protein isolate was collected at pH 5.5. The protein isolates were then divided into two batches and 2.5% NaCl was added to each batch. The pH of one sample was adjusted to 6.0, and the other was adjusted to pH 7.0. The material was then stuffed into casings and heated in a water bath for 30 minutes at 90° C. The material was then removed, cooled in an ice bath, and stored overnight in a refrigerator before testing. Gels were also prepared directly from MSDC as a control.

The gelation characteristics of the protein isolate (prepared by the method of the present invention) and the original MSDC were compared. Results are provided in Table 5.

TABLE 5

|  | Protein Isolate pH 6.0 | Protein Isolate pH 7.0 | MSDC |
| --- | --- | --- | --- |
| % lipid original (dry basis) | — | — | 52.2 |
| % lipid (dry basis) | 9.1 | 9.5 | 41.7 |
| pH | 6.18 | 7.03 | 6.66 |
| % water | 78 | 79 | 64 |
| L value | 54 | 52 | 48 |
| Torsion test |  |  |  |
| Stress (kPa) | 78 | — | 44 |
| Strain | 1.45 | — | 1.45 |
| Puncture, gel strength, g.cm |  |  |  |
| Less heating[a] | 677 | 463 | 395 |
| More heating[a] | 842 | 517 | 255 |

[a]Exposed to cooking temperature for a shorter or longer period because of location in sample.

Protein isolates prepared by the method of the present invention showed improvements in water binding and in gel strength. The lean portion of the protein isolate prepared at pH 6 had 28% more water (and 21.1% greater weight) than the lean portion of the MSDC. The protein isolates also had a lower lipid content than the MSDC.

Example 5

Use of a Protein Isolate as a Functional Ingredient, and the Effect of Various Chopping Methods on Gel Quality The effect of utilizing a protein isolate prepared by the methods of the present invention as an ingredient in foods was investigated. Specifically, alkaline-extracted protein isolates were substituted for chicken breast muscle in chicken breast muscle wieners. Further, the effect of various chopping methods on gel quality was investigated.

Preparation of Protein Isolate. 4800 ml of water was added to 600 g of MSDC (1:8 w/v). The mixture was homogenized with a Polytron for 2 minutes and the fat at the top of the mixture was removed. The pH was then adjusted to 10.5. The mixture was centrifuged at 10,000×g for 30 minutes. The neutral fat at the top of the mixture and the insoluble fraction in the sediment (which contains mostly collagen and bone residue) was removed. The supernatant was passed through a double layer cheesecloth to retain the fat globules, and the pH was adjusted to 5.5 to precipitate the protein. The mixture was then centrifuged twice at 10,000×g for 30 minutes. The sediment was centrifuged again at the same speed for 30 minutes to further reduce the moisture content.

Preparation of Wieners. Wieners containing 0%, 25%, and 50% protein isolate (PI) were prepared according to the formulae shown in Table 6.

TABLE 6

| Ingredients | Control 100% CBM | 25% PI Substitution | 50% PI Substitution |
| --- | --- | --- | --- |
| CBM | 124.13 | 93.09 | 62.06 |
| PI | 0.00 | 31.03 | 62.06 |
| Ice | 12.41 | 12.41 | 12.41 |
| Salt | 2.89 | 2.89 | 2.89 |
| STP | 0.49 | 0.49 | 0.49 |
| Na Nitrite | 0.02 | 0.02 | 0.02 |
| Erythobate | 0.07 | 0.07 | 0.07 |
| Fat (pork, 30%) | 60.00 | 60.00 | 60.00 |

Chopping Methods. Chopping methods utilized were as follows: method (a): a mixture containing all ingredients was chopped for 2.5 minutes; method (b): a mixture containing all ingredients except fat was chopped for 1 minute, followed by the addition of fat and additional chopping (1.5 minutes); method (c): a mixture containing all ingredients except fat and protein isolate was chopped for 1 minute, followed by the addition of fat and additional chopping (0.5 minutes), followed by the addition of protein isolate and additional chopping (1 minute). Mixing by hand was performed for every 30 seconds of chopping, at a temperature of less than 18° C. Results are depicted in the tables below.

TABLE 7

Percent water loss after cooking and cooling

| Protein Composition | Chopping Method | % Total Fat Loss | % Total Water Loss |
|---|---|---|---|
| 100% CBM | a | Not Observed | 3.8 ± 0.6 |
| 75% CBM + 25% PI | a | Not Observed | 4.5 ± 0.7 |
| 75% CBM + 25% PI | b | Not Observed | 4.3 ± 0.4 |
| 75% CBM + 25% PI | c | Not Observed | 4.5 ± 0.3 |
| 50% CBM + 50% PI | a | Not Observed | 7.5 ± 0.6 |

TABLE 8 pH values of gel product

| Protein Composition | pH |
|---|---|
| 100% CBM | 6.27 |
| 75% CBM + 25% PI | 6.21 |
| 75% CBM + 25% PI | 6.19 |
| 75% CBM + 25% PI | 6.20 |
| 50% CBM + 50% PI | 6.18 |

TABLE 9

Torsion test

| Protein Composition | Stress | Strain |
|---|---|---|
| 100% CBM | 81.1 ± 4.9 | 1.68 ± 0.02 |
| 75% CBM + 25% PI | 80.8 ± 3.8 | 1.66 ± 0.06 |
| 75% CBM + 25% PI | 97.5 ± 10.7 | 1.78 ± 1.72 |
| 75% CBM + 25% PI | 88.9 ± 8.9 | 1.72 ± 0.11 |
| 50% CBM + 50% PI | 76.22 ± 9.9 | 1.46 ± 0.11 |

TABLE 10

Color comparison

| Protein Composition | L | a | b |
|---|---|---|---|
| 100% CBM | 78.44 ± 0.45 | 4.7 ± 0.68 | 10.43 ± 0.64 |
| 75% CBM + 25% PI | 73.22 ± 0.48 | 7.47 ± 0.19 | 10.48 ± 0.05 |
| 75% CBM + 25% PI | 73.72 ± 0.35 | 7.43 ± 0.17 | 10.59 ± 0.17 |
| 75% CBM + 25% PI | 71.64 ± 0.88 | 8.28 ± 0.18 | 10.61 ± 0.18 |
| 50% CBM + 50% PI | 70.03 ± 0.54 | 7.29 ± 0.14 | 10.16 ± 0.10 |

It was observed that at least 25% of the chicken breast muscle can be substituted for the protein isolate without any significant loss in functional characteristics, with the exception of color.

Example 6

Alkaline Treatment of Animal Muscle Prevents Oxidation by Inactivating Deoxyhemoglobin To determined whether alkaline solubilization of animal muscle protein led to advantages independent from enabling membrane lipid removal, washed cod muscle was prepared as described in Richards et al., J. Agric. Food Chem. 48:3141-3147, 2000. Trout hemolysate was then added to the washed cod samples to achieve a hemoglobin concentration of 6 µmol/kg. The samples were then stored at 5° C. for 15 hours after establishing a stable pH value for the sample. At the end of the incubation, thiobarbituric acid reactive substances (TBARS), a surrogate for oxidation products, were quantified as described in Richards et al., supra. The results are summarized in FIG. 1 and indicate that hemoglobin-dependent oxidation was reduced or eliminated at pH values of about 7 or above. At pH values below 7, significant oxidation was observed. In general, a TBAR value of greater than 20 µmol/kg indicates strong oxidation. As described in Richards et al., supra, this reduction in hemoglobin-dependent oxidation coincides with a decrease in the proportion of total hemoglobin that is in the form of deoxyhemoglobin. Thus, the results suggest that alkaline treatment of animal muscle, especially red animal muscle, prevents deoxyhemoglobin from reacting with and oxidizing biological molecules in an animal muscle mixture, thereby explaining in part the benefits of the invention described herein.

Example 7

Alkaline Treatment of Animal Muscle Improves Edible and Gellable Protein Yield by at Least Two Mechanisms To better understand the mechanism(s) for the high protein yields and good quality gels described herein, herring muscle was prepared in hydrochloric acid (pH 2.6) as described in Kelleher et al., "Functional chicken muscle isolates prepared using low ionic strength, and solubilization/precipitation," 53rd Ann. Reciprocal Meat Conf., Jun. 18-21, 2000, Am. Meat. Sci. Assoc., Savoy, II, pp. 76-81. The same procedure was used to produce protein isolate in base (pH 10.7), except that in this case, solubilization and incubation were done at an alkaline pH using sodium hydroxide. The samples were incubated on ice for about 165 minutes and then loaded onto a 4-20% sodium dodecylsulfate-polyacrylamide gel under standard reducing conditions. Electrophoresis of the gel and Coomassie Blue staining allowed visualization of the myosin heavy chain protein band at about 205 kDa. Remarkably, the herring muscle incubated at a pH of 2.6 showed considerable breakdown of myosin heavy chain while no loss of myosin heavy chain was detected in the herring muscle incubated at a pH of 10.7. It was hypothesized that alkaline conditions inhibited lysosomal proteases (e.g., cathepsins), which were responsible for myosin hydrolysis at a more acidic pH.

In a second experiment, frozen Alaskan pollock muscle protein was prepared, solubilized under different pH conditions, and precipitated as described in Example 1. The percentage by weight of protein recovered after precipitation was 22.7% at neutral pH, 66.1% at pH 11.0, and 58.5% at pH 3.0. It was noted that the protein recovered from the pH 11.0 sample was able to form a gel. This result, in part, led to the following hypothesis.

Gadoid fish, such as Alaskan pollock, Pacific hake, and blue whiting, are important food fish and are used to produce surimi. When gadoid species are frozen, an enzyme in the flesh, trimethylamine oxide demethylase, breaks down trimethylamine oxide in the flesh to dimethylamine and formaldehyde. The formaldehyde produced in turn denatures muscle protein, thereby rendering them insoluble, even under alkaline conditions. It is believed that the alkaline treatment described can solubilize some of the modified proteins due to the high negative charge on the proteins at this pH. It is also possible that the alkaline treatment can reverse at least in part the reaction of the fish proteins with formaldehyde, thereby rendering the fish protein soluble.

The results in this example suggest that the advantages of the present invention can operate through more than one mechanism.

OTHER EMBODIMENTS

It is to be understood that while the invention has been described in conjunction with the detailed description thereof, the foregoing description is intended to illustrate and not limit the scope of the invention, which is defined by the scope of the claims. Other aspects, advantages, and modifications are within the scope of the following claims.

What is claimed is:

1. A method for isolating edible protein from animal muscle, the method comprising obtaining animal muscle comprising animal muscle protein;

preparing an animal muscle mixture comprising the animal muscle and water, wherein the pH of the animal muscle mixture is sufficiently alkaline to solubilize animal muscle protein;

removing at least about 50% by weight of total membrane lipids from the mixture;

precipitating the animal muscle protein solubilized in the animal muscle mixture; and collecting the precipitated protein, thereby isolating the protein from the animal muscle, wherein the temperature of the mixture is maintained at 15° C. or less in each step of the method.

2. The method of claim 1, wherein the collected precipitated protein is capable of forming an edible gel.

3. The method of claim 1, further comprising forming an edible gel from the collected precipitated protein.

4. The method of claim 1, wherein the animal muscle mixture is prepared by adding the animal muscle to water to form a mixture and increasing the pH of the mixture to a level sufficient to solubilize animal muscle protein in the mixture.

5. The method of claim 4, wherein the animal muscle comprises about 15% or less by weight of the mixture prior to increasing the pH of the mixture.

6. The method of claim 4, wherein the animal muscle comprises about 10% or less by weight of the mixture prior to increasing the pH of the mixture.

7. The method of claim 4, wherein the pH of the mixture is increased by adding polyphosphate to the mixture.

8. The method of claim 4, wherein the mixture comprises a buffer prior to increasing the pH of the mixture.

9. The method of claim 8, wherein the buffer is selected from the group consisting of glycine, arginine, asparagine, cysteine, dipeptide carnosine, taurine, pyrophosphate, and orthophosphate.

10. The method of claim 1, wherein the animal muscle mixture is prepared by adding an aqueous solution to the animal muscle to form a mixture, wherein the pH of the aqueous solution is at a pH sufficiently alkaline to solubilize animal muscle protein in the mixture.

11. The method of claim 1, wherein the pH of the animal muscle mixture is about 10.0 or above.

12. The method of claim 1, wherein the pH of the animal muscle mixture is about 10.5 or above.

13. The method of claim 1, wherein at least about 70% by weight of total membrane lipids are removed from the mixture.

14. The method of claim 1, wherein at least about 90% by weight of total membrane lipids are removed from the mixture.

15. The method of claim 1, wherein membrane lipids are removed by centrifugation of the mixture.

16. The method of claim 15, wherein the mixture is centrifuged at about 5000×g or greater.

17. The method of claim 15, wherein the mixture is centrifuged at about 7000×g or greater.

18. The method of claim 15, wherein the mixture is centrifuged at about 10,000×g or greater.

19. The method of claim 1, wherein the membrane lipids are removed by filtration.

20. The method of claim 1, wherein membrane lipids are removed by adding an aggregant to the mixture.

21. The method of claim 20, wherein the aggregant is a polymer.

22. The method of claim 20, wherein the aggregant is a cationic polymer.

23. The method of claim 20, wherein the aggregant is an anionic polymer.

24. The method of claim 20, wherein the aggregant is selected from the group consisting of carrageenan, algin, demethylated pectin, gum arabic, chitosan, polyethyleneimine, spermine, and spermidine.

25. The method of claim 20, wherein the aggregant is a salt.

26. The method of claim 20, wherein the salt is selected from the group consisting of a calcium salt, magnesium salt, sulfate, and phosphate.

27. The method of claim 1, wherein the solubilized protein is precipitated by lowering the pH of the mixture.

28. The method of claim 27, wherein the pH of the mixture is lowered to about 5.5 or below.

29. The method of claim 27, wherein the pH of the mixture is lowered to about 4.0 or below, then raised to about 5.0 or above.

30. The method of claim 27, further comprising adding a buffer to the mixture prior to precipitation of the solubilized protein.

31. The method of claim 30, wherein the buffer is selected from the group consisting of histidine, succinate, citrate, pyrophosphate, malonate, alanine, glutamic acid, citric acid, lactic acid, phosphoric acid, and pyruvic acid.

32. The method of claim 1, wherein the precipitated protein is collected by centrifugation.

33. The method of claim 1, wherein the solubilized protein is precipitated by adding an aggregant to the mixture after removal of membrane lipids.

34. The method of claim 33, wherein the aggregant is a polyamine.

35. The method of claim 1, wherein the mixture comprises an iron chelator.

36. The method of claim 35, wherein the iron chelator is selected from the group consisting of ethylenediaminetetraacetic acid, diethylenetriaminepentaacidic acid, carnosine, anserine, uric acid, citric acid, phosphate, polyphosphate, ferritin, and transferrin.

37. The method of claim 1, further comprising washing the animal muscle with an aqueous solution prior to preparing the animal muscle mixture.

38. A method of isolating edible protein from animal muscle, the method comprising obtaining animal muscle comprising animal muscle protein;

preparing an animal muscle mixture comprising the animal muscle and water, wherein the pH of the animal muscle mixture is increased to a level sufficiently alkaline to solubilize animal muscle protein;

precipitating the solubilized protein from the animal muscle protein mixture; and collecting the precipitated protein, thereby isolating the edible protein from the animal muscle, wherein the temperature of the mixture is maintained at 15° C. or less in each step of the method, and the collected precipitated protein provides a yield of at least about 70% by weight of the total animal muscle protein in the mixture prior to increasing the pH.

39. The method of claim 38, wherein the animal muscle comprises about 50% or less by weight of the mixture prior to increasing the pH of the mixture.

40. The method of claim 38, wherein the animal muscle comprises about 30% or less by weight of the mixture prior to increasing the pH of the mixture.

41. The method of claim 38, further comprising removing insoluble matter from the mixture prior to precipitation of the solubilized protein.

42. The method of claim 41, wherein the insoluble matter is removed by centrifugation at about 4000×g or below.

43. The method of claim 38, wherein the animal muscle mixture is prepared by adding the animal muscle to water to form a mixture and increasing the pH of the mixture to a level sufficient to solubilize animal muscle protein in the mixture.

44. The method of claim 43, wherein the animal muscle comprises membrane lipids, further comprising removing membrane lipids from the mixture after increasing the pH of the mixture.

45. The method of claim 44, wherein at least about 50% by weight of total membrane lipids are removed from the mixture.

46. The method of claim 38, wherein the animal muscle is fish muscle.

47. The method of claim 38, wherein the animal muscle is chicken muscle.

48. The method of claim 38, wherein the collected precipitated protein is capable of forming an edible gel.

49. The method of claim 38, further comprising forming an edible gel from the collected precipitated protein.

50. The method of claim 38, wherein the animal muscle mixture is prepared by adding an aqueous solution to the animal muscle to form a mixture, wherein the pH of the aqueous solution is at a pH sufficiently alkaline to solubilize animal muscle protein in the mixture.

51. The method of claim 38, wherein the animal muscle comprises membrane lipids, further comprising removing at least about 50% by weight of the total membrane lipids from the animal muscle mixture before precipitating the solubilized protein.

52. The method of claim 20, wherein the aggregant is a polyamine.

* * * * *